U.S. Patent Number: 5,583,806
Date of Patent: Dec. 10, 1996

[54] OPTIMIZED BINARY ADDER FOR CONCURRENTLY GENERATING EFFECTIVE AND INTERMEDIATE ADDRESSES

[75] Inventors: Larry Widigen, Salinas; William A. Stutz, San Jose, both of Calif.

[73] Assignee: Advanced Micro Devices, Inc., Sunnyvale, Calif.

[21] Appl. No.: 403,011

[22] Filed: Mar. 10, 1995

Related U.S. Application Data

[63] Continuation-in-part of Ser. No. 324,439, Oct. 17, 1994.

[51] Int. Cl.$^6$ ............................................. G06F 7/50
[52] U.S. Cl. .................................................. 364/786
[58] Field of Search ............................... 364/746, 768, 364/784, 786

[56] References Cited

U.S. PATENT DOCUMENTS

| | | | |
|---|---|---|---|
| 4,355,355 | 10/1982 | Butwell et al. | 364/200 |
| 4,442,484 | 4/1984 | Childs, Jr. et al. | 364/200 |
| 4,972,338 | 11/1990 | Crawford et al. | 164/200 |
| 5,204,953 | 4/1993 | Dixit | 395/400 |
| 5,226,126 | 7/1993 | McFarland et al. | 395/375 |
| 5,233,553 | 8/1993 | Shak et al. | 364/746 |
| 5,274,834 | 12/1993 | Kardach et al. | 395/800 |
| 5,276,825 | 1/1994 | Blomgren et al. | 395/375 |

OTHER PUBLICATIONS

Blaauw, Digital System Implementation, Prentice Hall, 1976, Section 2-12, pp. 54–58.
Patterson et al., Computer Arithmetic: A Quantitative Approach, Morgan Kaufmann Pub., 1990, pp. A–42 through A–43.
Wallace, Computer Arithmetic, A Suggestion For A Fast Multiplier, IEEE Trans. on Elec. Computers, EC–13, 14–17, 1964, pp. 114–117.
Hwang, Computer Arithmetic: Principles, Architecture, And Design, John Wiley & Sons, 1979, pp. 98–100.

*Primary Examiner*—Roy N. Envall, Jr.
*Assistant Examiner*—Chuong D. Ngo
*Attorney, Agent, or Firm*—Townsend and Townsend and Crew LLP

[57] ABSTRACT

Carry-save adder techniques are used to concurrently generate Effective and Intermediate (also known as Relocation or Linear) Addresses with only a single carry propagation for each Address. Base, Scaled Index, and Displacement components are input to a first carry-save adder, which is common to both address calculations. A first sum vector and a first left-shifted carry vector are inputs to a first carry-propagate adder for generating the Effective Address. A second carry-save adder has as inputs a Segment Base Address, said first sum vector, and said first left-shifted carry vector. A second sum vector and a second left-shifted carry vector are inputs to a second carry-propagate adder for generating the Intermediate Address.

20 Claims, 2 Drawing Sheets

OPTIMIZED BINARY ADDER FOR CONCURRENTLY GENERATING EFFECTIVE AND INTERMEDIATE ADDRESSES

This application is a continuation-in-part of application Ser. No. 08/324,439, filed Oct. 17, 1994.

BACKGROUND OF THE INVENTION +ps CARRY-SAVE ADDERS

Gerrit A. Blaauw describes carry-save adders (CSAs) in section 2–12 of "Digital System Implementation" (Prentice-Hall, 1976). Blaauw indicates that the CSA was mentioned by Babbage in 1837, by von Neumann in 1947, and used in 1950 in M.I.T.'s Whirlwind computer. J. L. Hennessy and D. A. Patterson discuss carry-save adders on pages A-42 and A-43 of "Computer Architecture, A Quantitative Approach" (Morgan Kaufmann, 1990).

In "A Suggestion for a Fast Multiplier" (IEEE Transactions on Electronic Computers EC-13:14-17, 1964), C. S. Wallace, indicates that "an expedient now quite commonly used" is to add three numbers using a CSA. If a set of more than three numbers are to be added, three of the set are first added using the CSA and the carry and sum are captured. The captured carry and sum and routed back to two of the tree inputs, and another number from the set is input to the third input. (Whenever the carry-outs generated by a CSA are subsequently added in another adder, an implicit one-bit left shift of the carry-bits is implemented via the wiring between the adders.) The process is repeated until all of the numbers in the set have been added. Finally, the sum and carry are added in a "conventional" carry-propagate adder (CPA). In "Computer Arithmetic: Principles, Architecture, and Design" (John Wiley & Sons, 1979, pp. 98–100), K. Hwang describes this same technique in greater detail.

Wallace extended the use of CSAs from adding three-inputs to adding an arbitrary number of values simultaneously, while having only a single carry-propagate path. One application of the Wallace-tree (as it came to be known) is high-performance hardware multipliers. Generally, a Wallace-tree consists of successive levels of CSAs, each level reducing the number of values being added by 3:2, since each CSA takes three inputs and produces 2 outputs. At the bottom of the tree a CPA is used to add the last carry/sum pair.

X86 EFFECTIVE AND INTERMEDIATE ADDRESSES

U.S. Pat. No. 4,442,484 ('484) MICROPROCESSOR MEMORY MANAGEMENT AND PROTECTION MECHANISM, to Childs et al., issued Apr. 10, 1984, described the segmentation architecture subset of what is now known as the industry standard X86 Architecture, and is hereby incorporated by reference.

U.S. Pat. No. 4,972,338 ('338) MEMORY MANAGEMENT FOR MICROPROCESSOR SYSTEM, to Crawford et al., issued Nov. 20, 1990, described the addition of paging to the X86 Architecture, and is hereby incorporated by reference.

U.S. Pat. No. 5,204,953 ('953) ONE CLOCK ADDRESS PIPELINING IN SEGMENTATION UNIT, to Dixit, issued Apr. 20, 1993, discloses pipelined single-clock address generation for segment limit checking in the X86 architecture.

In the teachings of the X86 Architecture as taught in the foregoing cited patents, the Effective Address (EA) is calculated prior to the calculation of the relocation address (the end result of the segmentation process). The relocation address is also known more generally as the Intermediate Address (IA), because it is the address used as an input to the page translation process when paging is enabled. The relocation address is also known (especially in the Intel literature) as the Linear Address (LA).

The EA is an intermediate result that in the foregoing cited patents is taught as being calculated in a step prior to the calculation of the IA. The EA is used in tests of whether the segment limit has been exceeded. The EA may also be stored for potential use in future address calculations.

When IA is calculated subsequent to EA however, a performance loss results over what is possible if IA is calculated without EA as an intermediate result. Specifically, to generate EA requires a carry propagation operation. To generate IA from EA requires a subsequent carry propagation operation. If IA were calculated directly using the techniques taught by Wallace, only a single carry propagation would be required.

X86 ADDRESS SIZE AND ADDITION

In the present X86 Architecture, memory can be addressed using either 16-bit or 32-bit addresses. When 16-bit addresses are used, the Effective Address components are limited to having only 16-bits. However, the resulting Intermediate Address may exceed 16-bits, due to the carry out of the lower 16-bits. The specific address size used is determined by size specification bits in segment descriptors, instruction prefixes, and various defaults, as specified by the X86 Architecture. For example, programs that execute in real mode or virtual-8086 mode have 16-bit addresses by default.

Whereas X86 address size limitation to 16 bits indicates modulo 65536 (2 to the power 16) addition for Effective Address calculation and whereas modulo addition suggests subtraction of the modulus from trial results when such are at least equal to the modulus. Then a carry out of bit 15 of Effective Address addition represents the need to subtract a carry into bit 16 of the Intermediate Address addition.

It is common practice to organize carry propagate adders so as to expose intermediate carry terms such that the delay from such carries to sums are substantially less than from other addend inputs. This is the case in the present invention specifically with regard to carries into bit 16 which is chosen due to its equivalence to the modulus of Effective Address arithmetic.

SUMMARY OF THE INVENTION

It is an object of the present invention to optimize the performance of both Effective and Intermediate Address calculations.

A second object of the present invention is to concurrently (as opposed to sequentially) generate both Effective and Intermediate Addresses.

A third object of the present invention is to minimize the hardware required to calculate both Effective and Intermediate Addresses.

A fourth object of the present invention is to minimize the hardware required to implement a SIZE control used to effect the results of both Effective and Intermediate Address calculations.

It is a first feature of the present invention to use a first carry-save adder to calculate first carry and sum vectors from the Base, Scaled Index, and Displacement components of the Effective Address.

A second feature of the present invention is to calculate the Effective Address by coupling said first sum vector and a left-shifted version of said first carry vector to a first carry-propagate adder.

It is a third feature of the present invention to calculate second carry and sum vectors by coupling said first sum vector, said left-shifted version of said first carry vector, and the Segment Base Address, to a second carry-save adder.

A fourth feature of the present invention is to calculate the Intermediate Address by coupling said second sum vector and a left-shifted version of said second carry vector to a second carry-propagate adder.

It is a fifth feature of the present invention to qualify the 16 MSB of said first sum vector and a left shifted version of said first carry vector and the carry into bit 16 of said first carry propagate-adder.

A sixth feature of the present invention is to calculate the carry into bit 16 of said second carry propagate-adder with a logic block which couples to bit 16 of said left shifted version of said second carry vector, the carry out of bit 15 of said first carry propagate adder, the carry out of bit 15 of said second carry propagate-adder and a SIZE control bit.

A first advantage of the present invention is that only a single carry-propagation occurs in the path associated with each of the Effective and Intermediate Addresses calculated. To the best of their knowledge, the inventors believe they are the first to recognize that it is unnecessary and undesirable to have more than one carry propagation in the Intermediate Address calculation path.

A second advantage of the present invention is that the Effective and Intermediate Addresses are available concurrently. In particular, the Intermediate Address is available without first calculating the Effective Address. To the best of their knowledge, the inventors believe they are the first to recognize that the Intermediate Address can be calculated in parallel with the Effective Address.

A third advantage of the present invention is that said first carry-save adder, said first sum vector, and said first left-shifted carry vector are common to both the Effective and Intermediate Address calculations. Hence, the hardware required to concurrently generate the two addresses is minimized. To the best of their knowledge, the inventors believe they are the first to recognize that it is possible to optimize the Effective and Intermediate Address calculation paths using carry-save techniques and share common hardware and intermediate results.

A further advantage of the present invention is that a minimum number of gates are required to implement the SIZE control feature. SIZE control gates are not required for three inputs, but only for 16 MSB of the first sum vector and first left-shifted carry vector.

These and other features and advantages of the invention will be better understood in view of the accompanying drawings and the following detailed description including at least one exemplary embodiment, which illustrates various objects and features thereof. The exemplary embodiments show how these circuits can be used to perform Effective and Intermediate Address calculations in a particular microarchitecture. The use of these circuits is not limited to the context of the exemplary embodiments.

NOTATION

Figure 1:
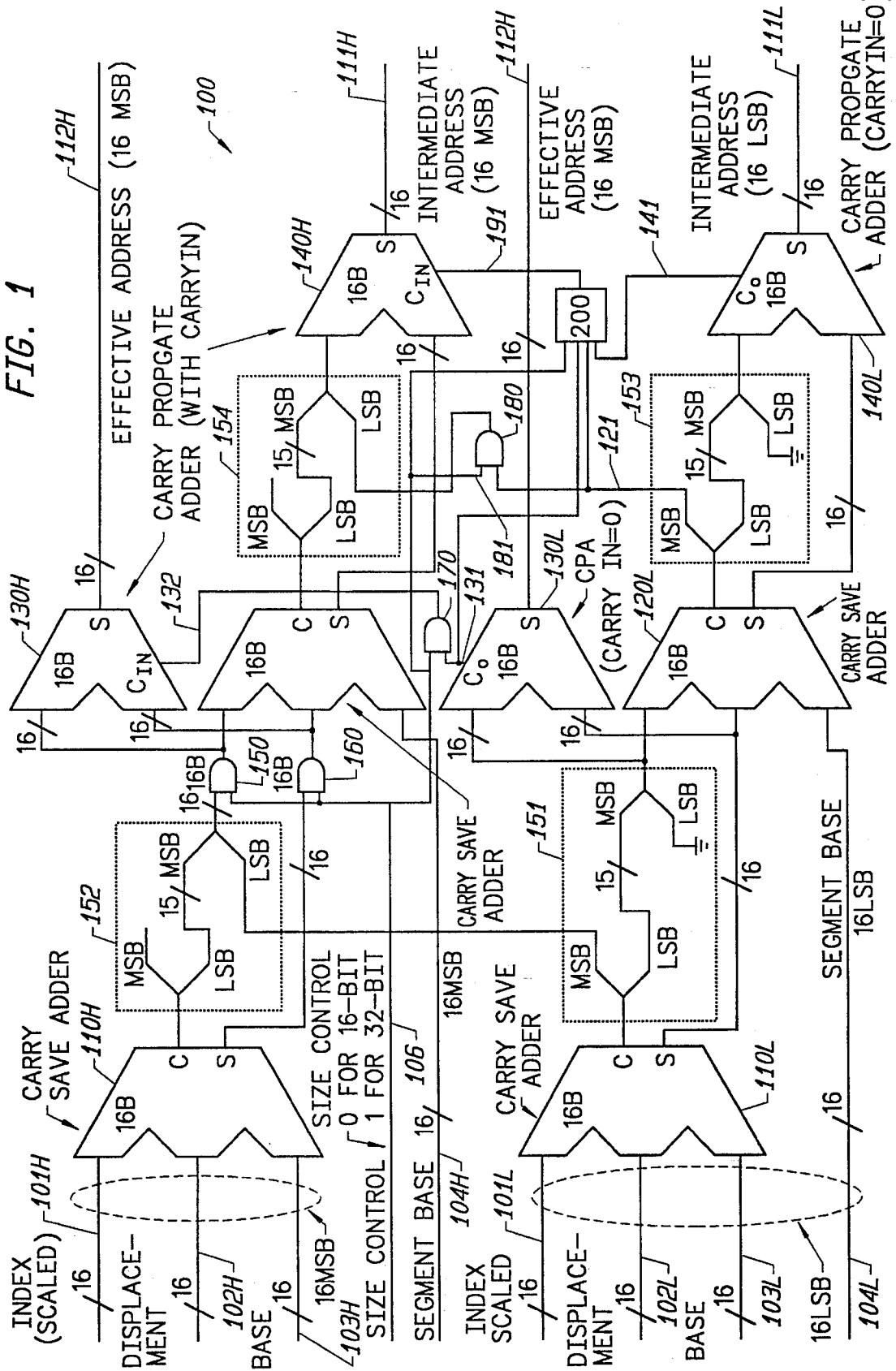
FIG. 1 illustrates the adders used in an exemplary embodiment of the present invention.

Schematic lines marked with a short diagonal indicate multi-bit signals. Multi-bit signals are sometimes also indicated by a bit range suffix, comprising the most significant bit number, a double-period delimiter, and the least significant bit number, all enclosed in angle brackets (e.g., <9..0>). Multi-bit wide components are sometimes indicated by a bit size consisting of a number followed by a capital B (e.g., 13B). It is implied that when a single-bit width signal, such as a clock phase or an enable, is connected to a multi-bit wide component, the single-bit width signal is fanned out to the corresponding number of bits. When merging two or more signals into one, or demerging two or more signals from one, the significance order of the individual component signals within the combined signal is explicitly shown with MSB and LSB labels adjacent to the merge or demerge.

DESCRIPTION OF THE PREFERRED EMBODIMENT

SYSTEM OVERVIEW

U.S. Pat. No. 5,226,126, ('126) PROCESSOR HAVING PLURALITY OF FUNCTIONAL UNITS FOR ORDERLY RETIRING OUTSTANDING OPERATIONS BASED UPON ITS ASSOCIATED TAGS, to McFarland et al., issued Jul. 6, 1993, which is assigned to the assignee of the present invention, described a high-performance X86 processor that defines the system context in which the instant invention finds particular application, and is hereby incorporated by reference.

In summary, '126 describes a processor that has multiple function units capable of performing parallel speculative execution. The function units include a Numerics Processor unit (NP), an Integer Execution Unit (IEU), and an Address Preparation unit (AP).

A difference between the instant invention and that of '126 is that the processor is now implemented in two chips (one being the NP unit) as opposed to the eight chip implementation taught in '126. Other differences between '126 and the processor of the preferred embodiment will be noted where pertinent to making and using the present invention and carrying out the best mode.

Instructions are fetched and decoded by a DECoder unit (DEC), which generates tagged pseudo-operations (p-ops) that are broadcast to the functional units. Each instruction will result in one or more p-ops being issued. For the purpose of this invention the terms p-op and operation are used interchangeably. Each operation executed by the processor may correspond to one instruction or to one p-op of a multi-p-op instruction.

DEC "relabels" (or reassigns) the "virtual" register specifiers used by the instructions into physical register specifiers that are part of each p-op. This allows DEC to transparently manage physical register files within the execution units. Register relabeling (reassignment) is integral to the processor's ability to perform speculative execution. The p-ops could be viewed as very wide horizontal (largely unencoded) control words. The wide horizontal format is intended to greatly facilitate or eliminate any further decoding by the execution units. DEC performs branch prediction and speculatively issues p-ops past up to two unresolved branches. I.e., DEC fetches down and pre-decodes instructions for up to three instruction streams.

The AP unit contains a relabeled virtual copy of the general purpose registers and segment registers and has the hardware resources for performing segmentation and paging of virtual memory addresses. AP calculates addresses for all memory operands, control transfers (including protected-mode gates), and page crosses.

IEU also contains a relabeled virtual copy of the general purpose registers and segment registers (kept coherent with AP's copy) and has the hardware resources for performing integer arithmetic and logical operations. NP contains the floating-point register file and has the floating-point arithmetic hardware resources.

Each execution unit has its own queue into which incoming p-ops are placed pending execution. The execution units are free to execute their p-ops largely independent of the other execution units. Consequently, p-ops may be executed out-of-order. When a unit completes executing a p-op it sends terminations back to DEC. DEC evaluates the terminations, choosing to retire or abort the outstanding p-ops as appropriate, and subsequently commands the function units accordingly. Multiple p-ops may be retired or aborted simultaneously. A p-op may be aborted because it was downstream of a predicted branch that was ultimately resolved as being mispredicted, or because it was after a p-op that terminated abnormally, requiring intervening interrupt processing.

Aborts cause the processor state to revert to that associated with some previously executed operation. Aborts are largely transparent to the execution units, as most processor state reversion is managed through the dynamic register relabeling specified by DEC in subsequently issued p-ops.

CONCURRENT EFFECTIVE AND INTERMEDIATE ADDRESS ADDER TOPOLOGY

FIG. 1 illustrates a concurrent Effective and Intermediate Address Adder according to the present invention. This Adder has particular application in the AP unit of the processor described supra, where it is used to calculate the Effective and Intermediate Addresses associated with all memory operands, control transfers, and page crosses. Other than the SIZE control 106, discussed infra, most signals in FIG. 1 have low (L, <15..0>) and high (H, <31..16>) 16-bit portions.

Three components of the Effective Address, the Base 103 (L and H), the Scaled Index 101 (L and H), and the Displacement 102 (L and H), are input to Carry-Save Adder (CSA) 110 (L and H). The carry outputs of CSA 110L are input to wiring network 151, which outputs the MSB carry to wiring network 152 and also left-shifts by one the 15 LSB carry bits, shifting in a zero to the LSB. The carry outputs of CSA 110H are input to wiring network 152, which left-shifts by one the 15 LSB carry bits, shifting into the LSB the MSB carry output from wiring network 151. The high order 16-bit shifted carry outputs and the unshifted sum outputs are then gated by the SIZE control 106 using 16-bit wide AND gates 150 and 160. The shifted carry outputs and the unshifted sum outputs, the high-order bits being qualified by SIZE control 106, define the extent of the hardware and signals that are common to both the Effective and Intermediate Address calculations.

The SIZE control 106 is driven by logic that determines the correct address size, according to the X86 Architecture, based on factors including: defaults, instruction prefixes, and the D-bit in the segment descriptor of the current code segment.

The low-order 16-bits of the Effective Address 112L are generated by Carry-Propagate Adder (CPA) 130L from the shifted carry bits from wiring network 151 and the sum bits from CSA 110L. CPA 130L also generates a carry out 131, which is subsequently gated by the SIZE control 106 using AND gate 170. Carry out 131 continues to a Logic Block 200 which is discussed in more detail in reference to FIG. 2. The high-order 16-bits of the Effective Address 112H are generated by Carry-Propagate Adder (CPA) 130H from the outputs of AND gates 150 and 160 and the qualified carry in 132 output from AND gate 170.

The shifted carry bits from wiring network 151 and the sum bits from CSA 110L are added with the low-order 16-bits of the Segment Base 104L in Carry-Save Adder (CSA) 120L to generate a second pair of low-order carry and sum vectors. The outputs of AND gates 150 and 160 are added with the high-order 16-bits of the Segment Base 104H in CSA 120H to generates a second pair of high-order carry and sum vectors.

The carry outputs of CSA 120L are input to wiring network 153, which output the MSB carry 121 to Logic Block 200 and to AND gate 180 which is gated with SIZE control 106 and feeds wiring network 154 and also left-shifts by one the 15 LSB carry bits, shifting in a zero to the LSB. The carry outputs of CSA 120H are input to wiring network 154, which left-shifts by one the 15 LSB carry bits, shifting into the LSB the MSB carry output 181 from AND gate 180.

The low-order 16-bits of the Intermediate Address 111L are generated by Carry-Propagate Adder (CPA) 140L from the shifted carry bits from wiring network 153 and the sum bits from CSA 120L. CPA 140L also generates a carry out 141 which continues to Logic Block 200. The high-order 16-bits of the Intermediate Address 111H are generated by Carry-Propagate Adder (CPA) 140H wiring network 154 and the sum bits from CSA 120H, and a qualified carry in 191 from Logic Block 200 which also accepts SIZE control 106 as an input.

Figure 2:
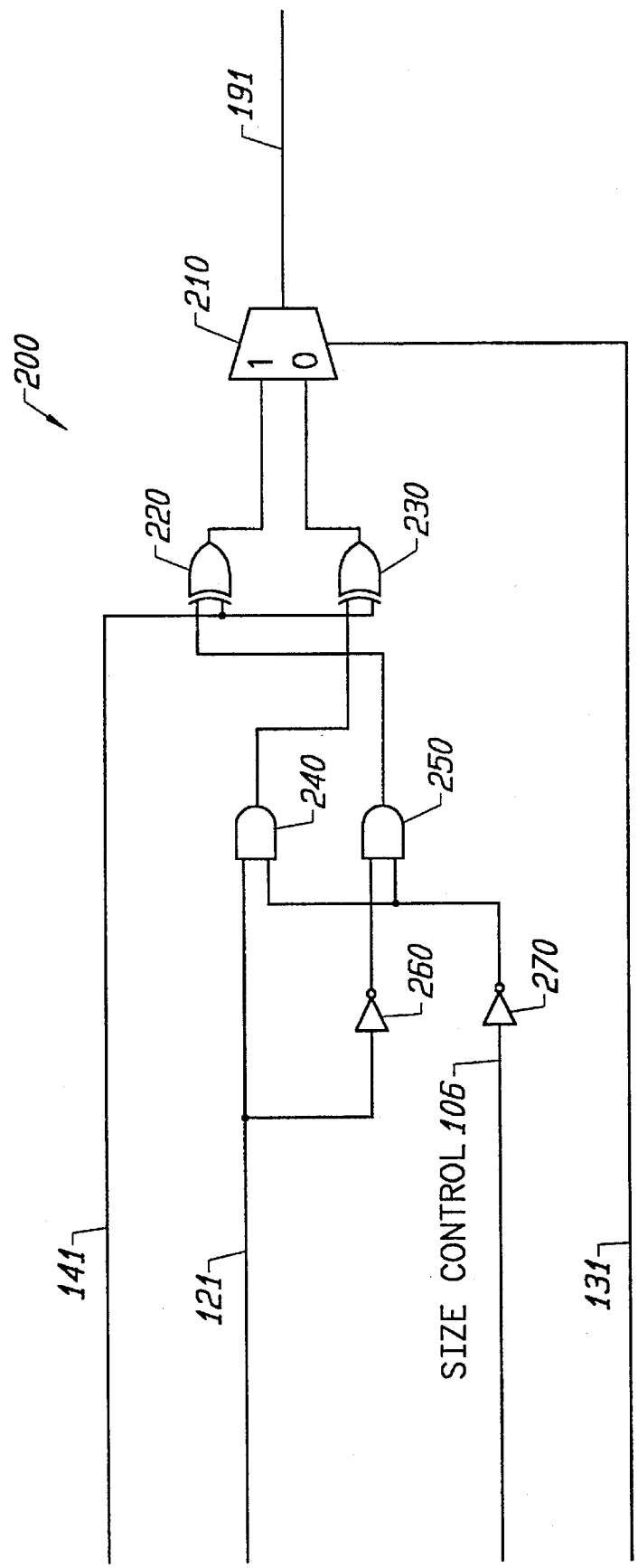
FIG. 2 illustrates a logic block used in an exemplary embodiment of the present invention.

FIG. 2 illustrates a logic block used in an exemplary embodiment of the present invention. Logic Block 200 receives as input SIZE control 106, MSB carry 121, carry out 131, and carry out 141. SIZE control 106 is inverted by an inverter 270 which is then input to AND gates 240 and 250. MSB carry 121 is an input to AND gate 240 and is inverted by an inverter 260 to provide input to AND gate 250. Carry out 141 is input to EXCLUSIVE-OR gates 220 and 230. The output from AND gate 240 is input to EXCLUSIVE-OR gate 230 whereas the output from AND gate 250 is input to EXCLUSIVE-OR gate 220. The output from the EXCLUSIVE-OR gates are inputs for a multiplexer 210 which has carry out 131 as a control. Carry in 191 is output from multiplexer 210.

The following table illustrates the output of Logic Block 200 for different inputs:

| SIZE control 106 | carry out 131 | MSB carry 121 | carry out 141 | carry in 191 |
| --- | --- | --- | --- | --- |
| 1 | $X_1$ | $X_1$ | 0 | 0 |
| 1 | $X_1$ | $X_1$ | 1 | 1 |
| 0 | 0 | 0 | 0 | 0 |
| 0 | 0 | 0 | 1 | 1 |
| 0 | 0 | 1 | 0 | 1 |
| 0 | 0 | 1 | 1 | $X_2$ |
| 0 | 1 | 0 | 0 | $X_2$ |
| 0 | 1 | 0 | 1 | 0 |
| 0 | 1 | 1 | 0 | 0 |
| 0 | 1 | 1 | 1 | 1 | where $X_1$ indicates that the specific input does not matter and $X_2$ indicates an output that should not occur. Logic Block 200 then with regard to carries from the 16 LSB to the 16 MSB of said second carry propagate adder either subtracts (truncates) a carry if carry out 131 is present and MSB carry 121 was not present to be subtracted (truncated) by AND gate 180 or either adds back a carry if carry out 131 is not present and MSB carry 121 was present. In which case, the Logic Block may take advantage of the fact that its input carry out 141 will not be present. Otherwise, if SIZE control 106 indicates 32 bit addressing, Logic Block passes carry out 141 to its output, carry in 191. The net effect is a single carry input, carry in 191, connected to the high speed input of carry propagate adder 140H which is an object of the present invention.

CONCLUSION

Although the present invention has been described using a particular illustrative embodiment, it will be understood that many variations in construction, arrangement and use are possible within the scope of the invention. For example, the Intermediate Address could be calculated from the first carry and sum vectors using a custom three-input carry-propagate adder. Also, the effect of the SIZE parameter could be implemented differently (albeit less efficiently) while still carrying out the Effective and Intermediate Address calculations according to the present invention. The present invention is thus to be considered as including all possible modifications and variations encompassed within the scope of the appended claims.

What is claimed is:

1. A binary adder for concurrently generating effective and intermediate addresses, said adder comprising:
   (a) a first three-input carry-save adder generating first carry and sum vectors, said first carry-save adder receiving as input a first base address, a first scaled index address, and a first displacement address;
   (b) a second three-input carry-save adder generating second carry and sum vectors, said second carry-save adder coupled to said first carry-save adder and receiving as input a first segment base address, said first sum vector and a first input vector including bits of said first carry vector;
   (c) a first carry-propagate adder generating a first effective address, said first carry-propagate adder coupled to said first carry-save adder and receiving as input said first sum vector and said first input vector; and
   (d) a second carry-propagate adder generating a first intermediate address, said second carry-propagate adder coupled to said second carry-save adder and receiving as input said second sum vector and a second input vector including bits of said second carry vector.

2. The adder of claim 1, wherein said first input vector includes least significant bits of said first carry vector left shifted one bit.

3. The adder of claim 1, wherein said second input vector includes least significant bits of said second carry vector left shifted one bit.

4. The adder of claim 1, wherein said first effective and intermediate addresses are least significant bit portions of x86 architecture addresses.

5. The adder of claim 4, further comprising:
   (e) a third three-input carry-save adder generating third carry and sum vectors, said third carry-save adder receiving as input a second base address, a second scaled index address, and a second displacement address;
   (f) a fourth three-input carry-save adder generating fourth carry and sum vectors, said fourth carry-save adder coupled to said third carry-save adder and receiving as input a second segment base address, said third sum vector and a third input vector including bits of said third carry vector;
   (g) a third carry-propagate adder generating a second effective address, said third carry-propagate adder coupled to said third carry-save adder and receiving as input said third sum vector and said third input vector; and
   (h) a fourth carry-propagate adder generating a second intermediate address, said fourth carry-propagate adder coupled to said fourth carry-save adder and receiving as input said fourth sum vector and a fourth input vector including bits of said fourth carry vector.

6. The adder of claim 5, further comprising size control logic, said size control logic zeroing said third carry and sum vectors in response to a size control signal.

7. The adder of claim 5, wherein the least significant bit of said third carry vector is equal to the most significant bit of said first carry vector.

8. The adder of claim 5, wherein the least significant bit of said fourth carry vector is equal to the most significant bit of said second carry vector.

9. The adder of claim 1, wherein said first effective and intermediate addresses are most significant bit portions of x86 architecture addresses.

10. The adder of claim 9, further comprising size control logic, said size control logic zeroing said first carry and sum vectors in response to a size control signal.

11. A binary adder for concurrently generating effective and intermediate addresses, said adder comprising:
    (a) a first adder means generating first carry and sum vectors, said first adder means receiving as input a base address, a scaled index address, and a displacement address;
    (b) a second adder means generating an effective address, said second adder means coupled to said first adder means and receiving as input said first sum vector and a first input vector including bits of said first carry vector; and
    (c) a third adder means generating an intermediate address, said third adder means coupled to said first adder means and receiving as input said first sum vector, said first input vector and a segment base address.

12. The adder of claim 11, wherein said first adder means is a carry-save adder.

13. The adder of claim 11, wherein said second adder means is a carry-propagate adder.

14. The adder of claim 11, wherein said third adder means includes a carry-save adder and a carry-propagate adder.

15. The adder of claim 11, wherein said effective and intermediate addresses include least and most significant bit portions of x86 architecture addresses.

16. The adder of claim 15, further comprising a means for zeroing said most significant bit portions of said effective and intermediate addresses in response to a size control signal.

17. A method of concurrently generating effective and intermediate addresses, said method comprising the steps of:
    adding components of an effective address to generate carry and sum vectors;
    generating said effective address from said carry and sum vectors; and generating an intermediate address from said carry and sum vectors and a segment base address;

wherein said steps of generating said effective and intermediate addresses are performed concurrently.

18. The method of claim 17, further comprising the step of inputting said components of said effective address, said components including a base address, a scaled index address, and a displacement address.

19. The method of claim 17, wherein said step of generating said intermediate address includes the step of inputting a segment base address.

20. The method of claim 17, further comprising the step of zeroing bits of said effective and intermediate addresses in response to a size control signal.

* * * * *